(12) United States Patent
Ogi et al.

(10) Patent No.: US 6,351,605 B1
(45) Date of Patent: Feb. 26, 2002

(54) REMOTE CONTROL, AUTO-FOCUS CAMERA SYSTEM

(75) Inventors: Mikio Ogi, Saitama; Yutaka Ohsawa, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/604,928

(22) Filed: Jun. 28, 2000

(30) Foreign Application Priority Data

Jun. 29, 1999 (JP) ............................................. 11-183531

(51) Int. Cl.[7] ........................... G03B 17/00; G03B 17/38
(52) U.S. Cl. ............................ 396/56; 396/59; 396/502
(58) Field of Search ............................. 396/48, 56, 57, 396/58, 59, 89, 373, 502, 219

(56) References Cited

U.S. PATENT DOCUMENTS

| | | | |
|---|---|---|---|
| 5,323,203 A | * | 6/1994 | Maruyama et al. ............ 396/57 |
| 5,541,695 A | * | 7/1996 | Teremy et al. ................. 396/59 |
| 5,541,703 A | | 7/1996 | Suzuka .......................... 396/59 |
| 5,664,233 A | | 9/1997 | Suzuka .......................... 396/59 |
| 6,144,804 A | * | 11/2000 | Inoue ............................ 396/51 |

* cited by examiner

Primary Examiner—David M. Gray
Assistant Examiner—Rochelle Blackman
(74) Attorney, Agent, or Firm—Greenblum & Bernstein, P.L.C.

(57) ABSTRACT

A remote control auto-focus camera system includes a camera body; a transmitter provided separately from the camera body, wherein the transmitter transmits a remote control signal; a focusing device, a photometering device and an exposure device, provided in the camera body; a photographing operation member, provided on the camera body, which is adapted to operate both the photometering device and the focusing device upon a first operation thereof and to operate the exposure device upon a second operation thereof; and a controller adapted to operate the photometering device and the exposure device in this order without operating the focusing device upon receipt of the remote control signal transmitted.

4 Claims, 6 Drawing Sheets

REMOTE CONTROL, AUTO-FOCUS CAMERA SYSTEM

BACKGROUND OF THE INVENTION

1. Field of the Invention

The present invention relates to an automatic focusing camera in which a photographing operation can be controlled by a remote controller.

2. Description of the Related Art

In a known auto-focus (AF) camera which can be controlled by a remote controller, when the camera receives a remote control signal emitted from a remote controller, the AF operation is first carried out and thereafter the exposure operation is carried out. Therefore, if a user carries out the focusing operation to obtain a desired image of an object, while observing the object through a view finder, and thereafter emits the remote control signal, it is likely that the desired object is out of focus when the picture thereof is taken, or the user tends to fail to take the sharpest possible image of a desired object, since if the AF device of the camera focuses on an object other than the desired object, the user cannot identify/confirm the in-focus object upon photographing. In order to prevent these problems, it is necessary for the photographer to switch the AF mode to a manual mode upon remote control photographing. The mode switching operation is troublesome and is not desirable.

SUMMARY OF THE INVENTION

It is an object of the present invention to provide a remote control auto-focus camera system in which no defocusing occurs upon photographing, so that a desired remote control photographing can be easily carried out.

To achieve the object mentioned above, according to an aspect of the present invention, a remote control auto-focus camera system is provided, including a camera body; a transmitter provided separately from the camera body, wherein the transmitter transmits a remote control signal; a focusing device, a photometering device and an exposure device, all provided in the camera body; a photographing operation member provided on the camera body, the photographing operation member adapted to operate both the photometering device and the focusing device upon a first operation thereof and to operate the exposure device upon a second upon a second operation thereof; and a controller adapted to operate the photometering device and the exposure device in this order without operating the focusing device upon receipt of the remote control signal transmitted by the transmitter.

With this arrangement, when the remote control signal transmitted from the transmitter is received, the exposure operation is carried out after the photometering operation is carried out without performing the focusing operation. Consequently, it is possible for a photographer to take a picture of a desired object, which has been set in focus, without being out of focus.

In an embodiment, when the remote control signal is received within a predetermined time limit, wherein the focusing device and the photometering device have been operated in accordance with the first operation of the photographing operation member, the controller operates the exposure device after a second operation of the photometering device.

Preferably, the camera body further includes a mode selecting member for selecting one of a remote control photographing mode and a remote control canceling mode. When the remote control signal is received while the remote control photographing mode is selected, the controller operates the photometering device initially, and subsequently operates the exposure device. However, when the remote control signal is received while the remote control canceling mode is selected, the controller does not operate the photometering device and does not operate the exposure device.

Furthermore, it is preferable that the focusing device is operated in accordance with the first operation of the photographing operation member, when any one of the remote control photographing mode and the remote control canceling mode is selected.

According to another aspect of the present invention, a remote control auto-focus camera system is provided, which includes a camera body; a transmitter provided separate from the camera body, wherein the transmitter transmits a remote control signal; a photographing operation member provided on the camera for providing a first operation and a second operation; a focusing device which is operated in response to the first operation provided by the photographing operation member; a photometering device which is operated in response to one of the first operation provided by the photographing operation member and the remote control signal transmitted by the transmitter; and an exposure device which is operated in response to one of the second operation provided by the photographing operation member and the remote control signal transmitted by the transmitter, after a photometering operation by the photometering device has been completed.

The present disclosure relates to subject matter contained in Japanese Patent Application No.11-183531 (filed on Jun. 29, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
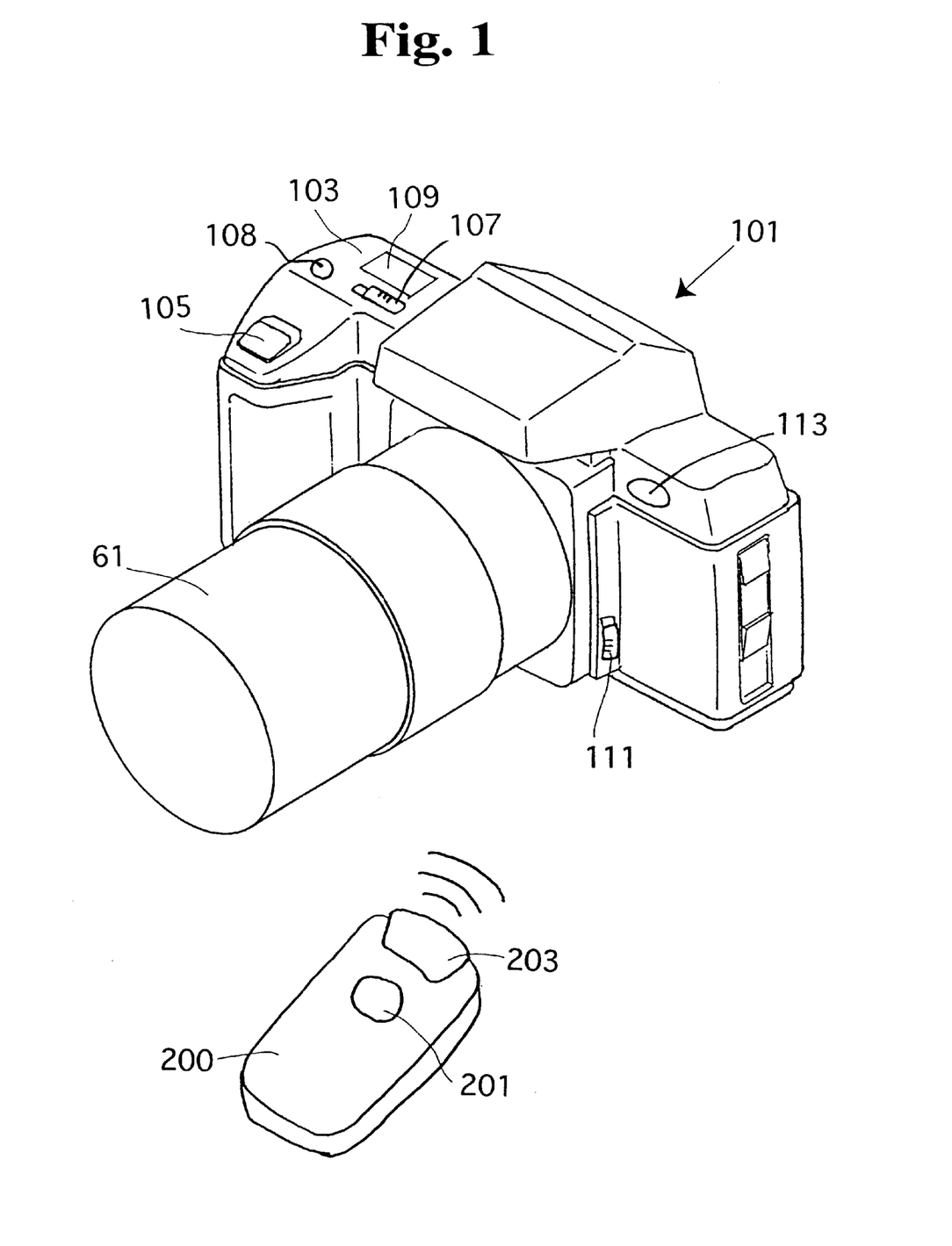
FIG. 1 is a perspective view of a camera body of an automatic focusing (AF) single lens reflex camera and a remote controller therefor, according to the present invention.

In FIG. 1 which shows a perspective view of a remote control AF single lens reflex camera system to which the present invention is applied, a camera body 101 is provided on its upper decorative plate 103 with a release button (photographing operation member) 105 on the left side as viewed from the front thereof. Behind the release button 105 and on the upper decorative plate 103 are provided a main slide-switch 107, a remote control switch button (mode selecting member) 108, and an external LCD 109 in which photographing data, such as the number of exposed frames of film, the shutter speed, and the aperture value, etc., is indicated. An AF mode switching lever 111 is provided on an outer plate of the camera body. The camera body 101 is also provided with a remote control signal receiver 113 which receives the remote control signal emitted from a remote controller (transmitter) 200 provided separately from the camera body 101.

The remote controller 200 includes a remote controller release button 201 and a remote controller signal emitter 203. When the remote controller release button 201 is turned ON, the remote controller 200 transmits a remote control signal toward the camera body 101 to perform an exposure operation.

Figure 2:
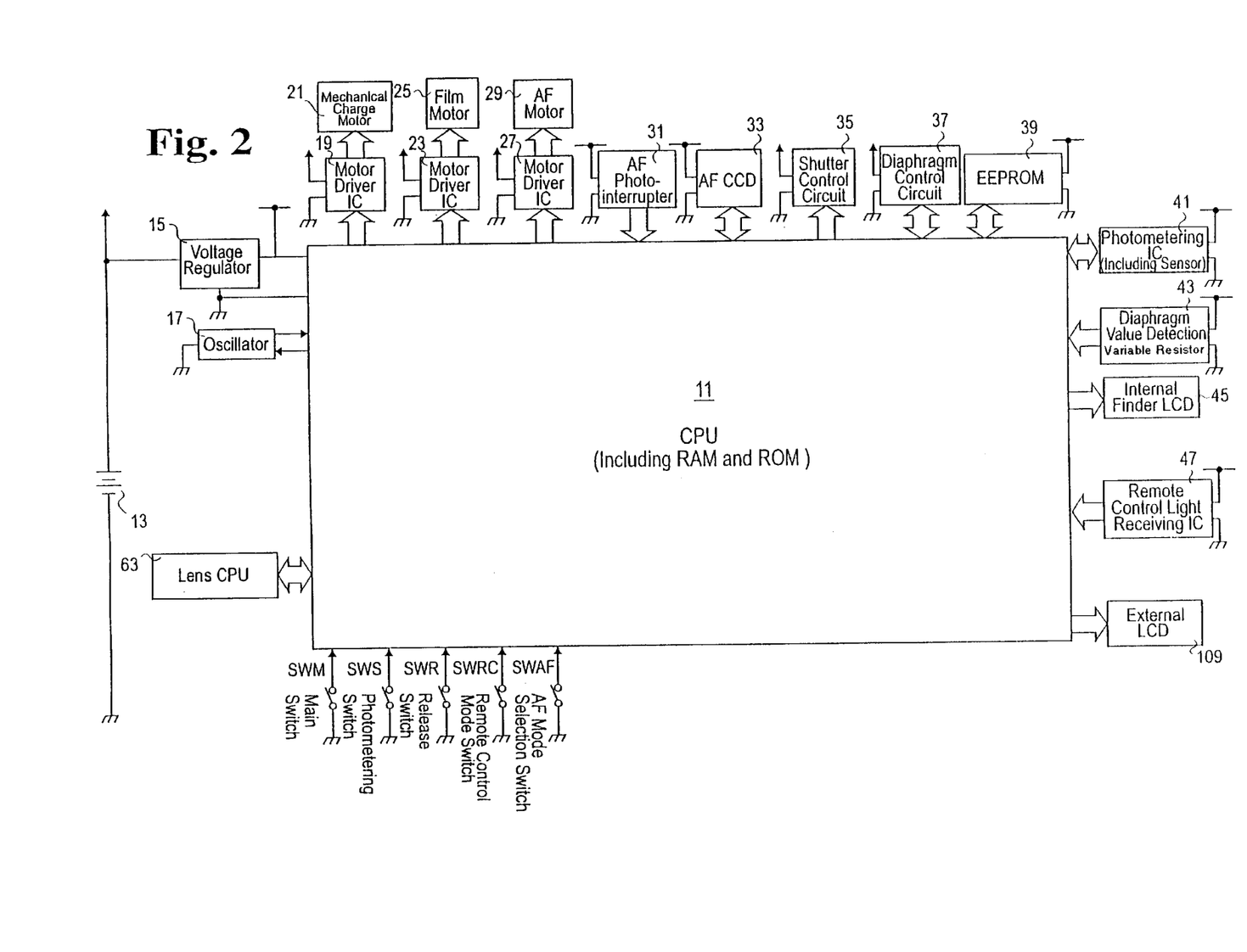
FIG. 2 is a block diagram of a control circuit of an AF single lens reflex camera shown in FIG. 1.
Figure 3:
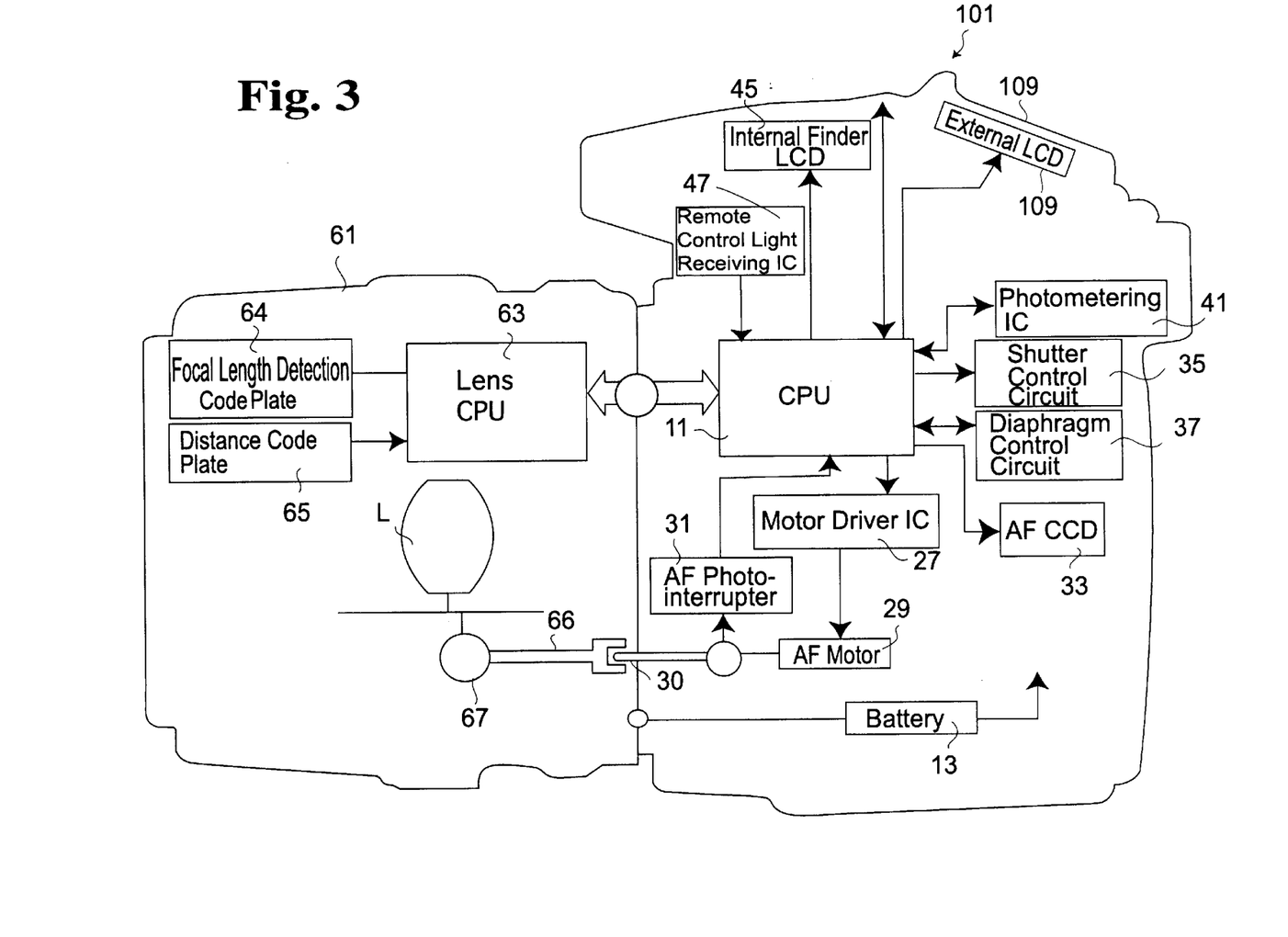
FIG. 3 is a block diagram of main components of an AF single lens reflex camera shown in FIG. 1, to which a photographing lens is attached.

The control system of the camera body 101 will be discussed below in detail with reference to the block diagram shown in FIGS. 2 and 3. The camera body 101 includes a CPU 11 which controls the general operation of the camera. The CPU 11 includes a ROM in which programs of various camera functions, etc., are stored, and a RAM in which various parameters and lens data, etc., are temporarily stored. An EEPROM 39 is connected to the CPU 11 to record the number of exposed frames of film, and various rewritable parameters and modes, etc.

A constant voltage is supplied to the CPU 11 from a battery 13 loaded in a battery compartment (not shown), through a voltage regulator 15. The CPU 11 operates an oscillator 17 by the constant voltage supplied through the voltage regulator 15, so that the CPU operates in synchronization with clock pulses output from the oscillator 17.

The switching devices which are connected to the CPU 11 are a main switch SWM, a photometering switch SWS, a release switch SWR, a remote control mode switch SWRC, and an AF mode selection switch SWAF.

The main switch SWM is associated with the main slide-switch 107. When the main slide-switch 107 is operated to turn ON the main switch SWM, the CPU 11 operates. Consequently, the CPU 11 supplies the peripherals with electricity and performs the operation corresponding to the switch operated.

The photometering switch SWS and the release switch SWR are turned ON when the release button 105 is depressed by a first operation (half depression/first operation) and by a second operation (full depression/second operation), respectively. When the photometering switch SWS is turned ON, the CPU 11 performs an AE operation in which an object brightness is obtained in accordance with the photometering signal input thereto from the photometering IC 41 and a aperture value set by a diaphragm ring of the photographing lens 61 is obtained in accordance with the resistance value of the aperture value detection variable resistor 43 to thereby determine the optimum shutter speed and aperture value. When the diaphragm ring of the photographing lens 61 is in the AUTO position (A), no resistance value of the aperture value detection variable resistor 43 is used, and an aperture value Av is calculated in the AE operation.

The photometering IC 41 is provided with a split type photometering sensor in which the photographing area is split into a plurality of areas, so that the measurement of the object brightness can be carried out in each photographing area.

Also, an AF operation is carried out in which a video signal of the object image is input from the phase-difference AF CCD 33 to calculate the amount of defocus, and the AF motor 29 is driven by the motor driver IC 27, so that the focusing lens group L of the photographing lens 61 is moved to the focal position. The rotation of the AF motor 29 is transmitted to the joint 66 of the photographing lens 61 through the joint 30. Consequently, the focus adjusting mechanism 67 is driven through the joint 66 to move the focusing lens group L to the focal position. The displacement of the focusing lens group L is determined based on the number of pulses of the AF photo-interrupter 31 which generates the pulses in accordance with the rotation of the AF motor 29. Consequently, the amount of drive of the AF motor 29 is controlled in accordance with the number of the AF pulses output from the AF photo-interrupter 31.

When the release switch SWR is turned ON, the CPU 11 controls a quick-return mirror (not shown) to move up, and actuates the diaphragm control circuit 37 in accordance with the aperture value set in the AE calculation to stop down the diaphragm of the photographing lens 61. Furthermore, a shutter control circuit 35 is actuated in accordance with the shutter speed to carry out an exposure operation. Upon completion of the exposure operation, a mechanical charge motor 21 is actuated by a motor driver IC 19 to move the quick-return mirror downwards and charge the springs for biasing the leading and trailing curtains of the shutter mechanism. Thereafter, the CPU 11 operates a film motor 25 via a motor driver IC 23 to wind the film by one frame.

The AF mode selection switch SWAF is adapted to switch the auto-focus control and the manual focus control in association with the AF mode switching lever 111. When the AF mode switching lever 111 is operated to turn ON the AF mode selection switch, the AF mode is set in the CPU 11, so that the AF operation is carried out in accordance with the operation of the photometering switch SWS.

The remote control mode switch SWRC is associated with the remote control mode switching button 108, so that a remote control mode (remote control photographing mode) and a normal mode (remote control canceling mode) are alternately selected each time the remote control mode switching button 108 is depressed (from OFF to ON and vice versa).

In the case where the remote control mode is selected, the CPU 11 performs first the brightness calculation operation and thereafter the exposure operation, in response to a remote control signal emitted from the remote controller 200 by a remote control light receiving IC 47. In this case, the CPU 11 performs the exposure operation without performing the AF operation even if the AF mode is set.

The external LCD 109 and an internal finder LCD 45 are connected to the CPU 11 as a display device for indicating information necessary to take a picture. No information is indicated when the main switch SWM associated with the main slide-switch 107 is OFF. When the main switch SWM is ON, the number of the exposed frames of film, and the selected shutter speed and mode, etc., are indicated in the external LCD 109. However, no information is indicated in the internal finder LCD 45 until the release button 105 is depressed by a half step (i.e., until the photometering switch SWS is turned ON) or until the AE calculation is carried out in accordance with the operation of the remote control mode switching button 108. After the AE calculation ends, photographing information, such as the calculated optimum shutter speed and aperture value, etc., are indicated in the external LCD 109 and the internal finder LCD 45.

If the photographing lens 61 having a lens CPU 63 is attached to the camera body 101, the CPU 11 data-communicates with the lens CPU 63 and receives lens data, such as the focal length, the current focal length in case of the photographing lens 61 being a zoom lens, the object distance (position of the focusing lens group L), and the open aperture, etc. The lens CPU 63 detects the focal length by a focal length detection code plate 64, detects the object distance (position of the focusing lens group L) by a distance code plate 65, and transmits the data to the CPU 11 of the camera body 101.

The operation of the single lens reflex camera (camera body 101) constructed as above will be explained below, with reference to the flow charts shown in FIGS. 4A, 4B and 5. The flow charts show the operations controlled by the CPU 11 in accordance with a program stored in the internal ROM thereof.

Figure 4A:
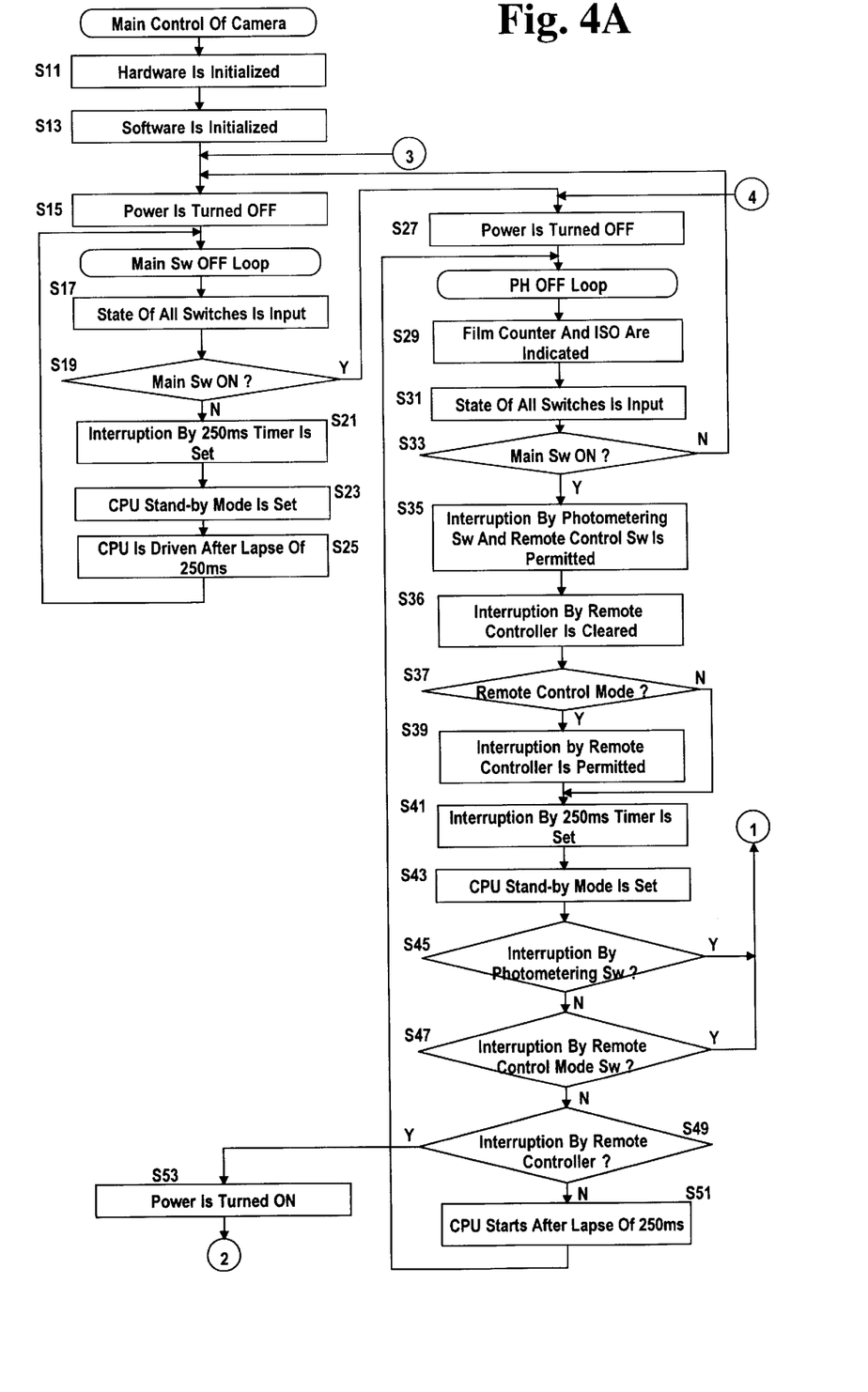
FIGS. 4A and 4B show a flow chart of the main operation of an AF single lens reflex camera shown in FIG. 1.
Figure 4B:
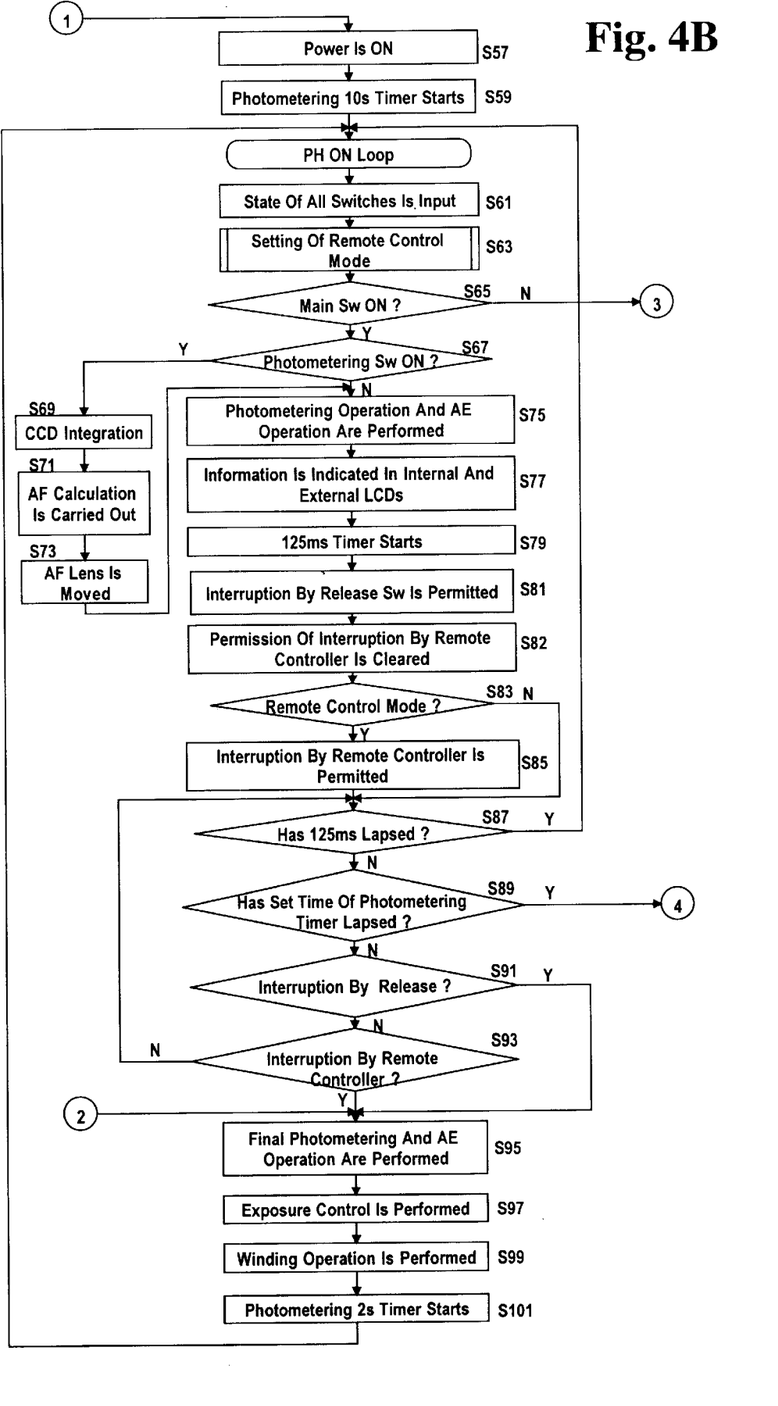

FIGS. 4A and 4B show the main operation of the camera body 101 when the battery (or batteries) 13 is loaded. When the battery cover of the battery compartment in which the battery is loaded is closed, the CPU 11 initializes the peripheral circuits connected to the input/output ports thereof (S11); initializes the input/output ports and the internal RAM, etc., (S13); and interrupts the power supply to the peripheral circuits (S15). The above-mentioned operations are carried out when the battery is loaded. When the battery is loaded, the following operations are repeated.

Main Switch SWM OFF Loop

The ON/OFF state of each switch is input, and it is checked whether the main switch SWM is ON (S17, S19). If the main switch SWM is OFF (S19; N), the interruption by the 250 ms timer is permitted and the CPU 11 is set in a stand-by position (sleep state). If 250 ms have lapsed, the stand-by of the CPU 11 is released and the CPU 11 continues onto operations S21 through S25. While the main switch is OFF, the operations at steps S17 through S25 are repeated. Note that the 250 ms timer is adapted to set the time interval at which whether or not the main switch SWM is turned ON is periodically checked.

PH OFF Loop

When the main switch SWM is turned ON (S19; Y), the CPU 11 interrupts the power supply to the peripheral circuits and indicates information, such as the number of exposed frames and ISO sensitivity, etc., necessary to take a picture, in the external LCD 109 (S27, S29). The remote control IC 47 is maintained in a state so as to be able to receive a remote control signal at the power OFF operation at step S27. The ON/OFF state of each switch and whether or not the remote control mode switch SWRC is turned from OFF to ON are input (S31). At step S33, whether or not the main switch SWM is ON is checked (S33). If the main switch SWM is OFF, the control is returned to S15 (S33; N). If the main switch SWM is ON, the interruption by the photometering switch SWS and the remote control mode switch SWRC is permitted, the remote control interruption permission is cleared, and whether or not the remote control mode is set is checked (S33; Y, S35, S36, S37). The remote control mode is set or released each time the remote control mode switch SWRC is turned ON when the remote control mode has been released or set, respectively, in the remote control mode setting operation (S63).

If the remote control mode is set, the interruption of the remote control is permitted (S37; Y, S39). If the remote control mode is not set, i.e., if the normal mode is set, the control skips step S39 and proceeds to step S41 (S37; N, S41). Thereafter, interruption by the 250 ms timer is permitted and the CPU 11 is set to a stand-by mode (S41, S43). Whether or not the photometering switch SWS is turned ON, or whether or not the state of the remote control mode switch SWRC has changed is checked (S45, S47).

If the photometering switch SWS is not turned ON and the state of the remote control mode switch SWRC has not changed (S45; N, S47; N), it is checked whether the main control is interrupted by the remote controller, i.e., whether the remote control light receiving IC 47 receives a remote control signal emitted from the remote controller 200 and whether the interruption by the remote controller is permitted (S49). If there is no interruption by the remote controller, the control waits until a set time of the 250 ms timer lapses. If the set time has lapsed, the CPU 11 begins to operate, and control is returned to the PH OFF Loop (S49; N, S51; S29). The interruption by the remote controller is permitted at step S39 in the case where the remote control mode is set at step S63.

Exposure Operation via Remote Control Signal

If there is an interruption by the remote controller (S49; Y), the power is supplied to the peripheral circuits (S53), and the object brightness calculation is carried out to obtain the optimum shutter speed and exposure value (S95). The shutter circuit 35 and the diaphragm control circuit 37 are operated in accordance with the shutter speed and the exposure value, thus obtained to carry out the exposure operation (S97). After the exposure operation ends, the film winding operation in which the film motor 25 is driven to wind the film by one frame is carried out (S99). Thereafter, the photometering 2 s (2-second) timer starts and the control is returned to the PH ON loop (S101; S61).

PH ON Loop

If the photometering switch SWS is turned ON or if the remote control mode switch SWRC is turned ON (S45; Y, or S47; Y), the control proceeds to step S57 to supply power to the peripheral circuits and start the photometering 10 s (10-second) timer (S57, S59). The control enters the PH ON loop. In the PH ON loop, the ON/OFF state of each switch and whether or not the remote control mode switch SWRC is turned ON from OFF are checked, and thereafter, the remote control mode setting operation is carried out (S61, S63).

Figure 5:
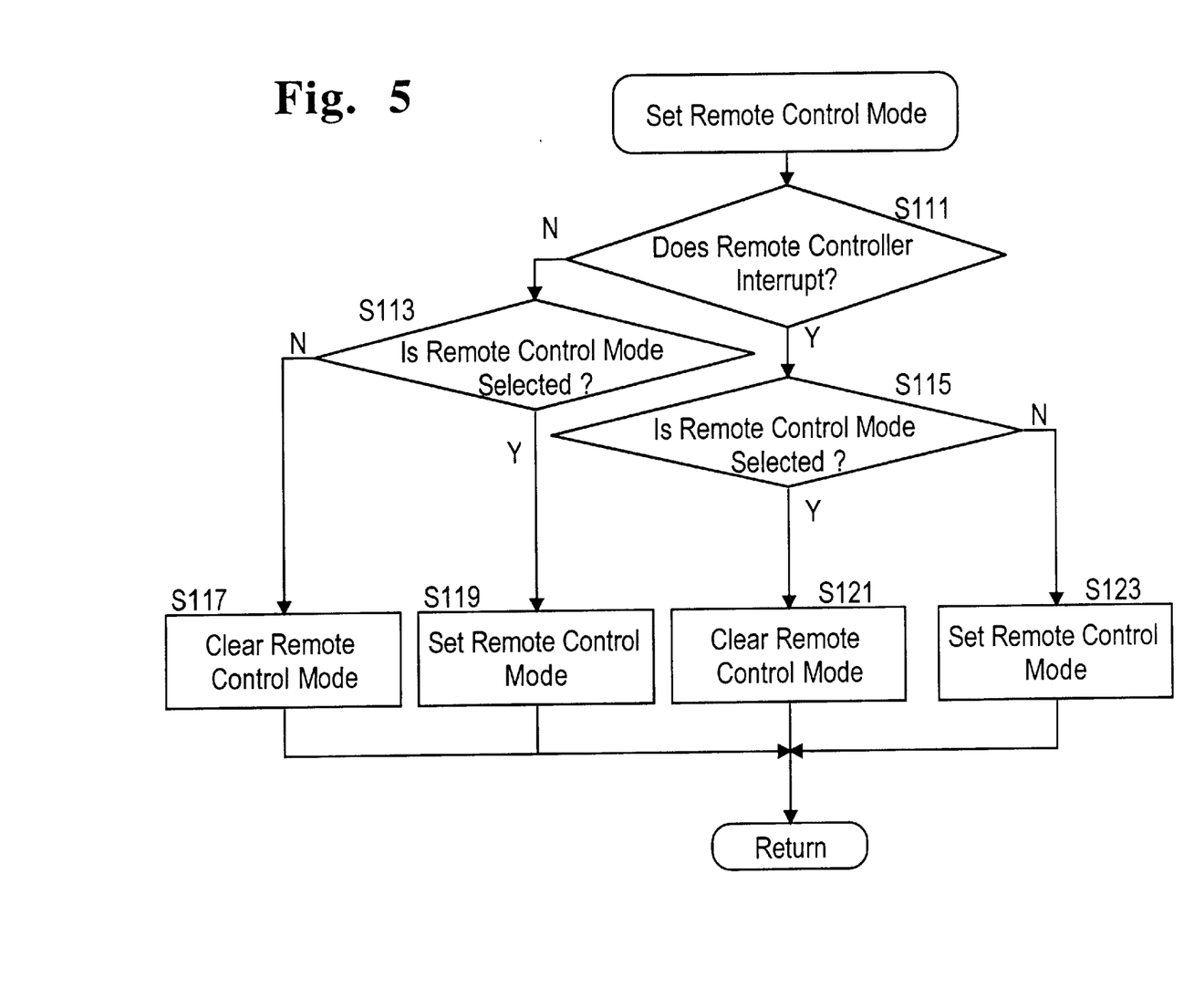
FIG. 5 is a flow chart of a remote control mode setting operation in an AF single lens reflex camera shown in FIG. 1.

In the remote control mode setting operation, as shown in FIG. 5, it is checked whether the remote control mode switch SWRC is turned ON from OFF (S111). Thereafter, it is checked whether the remote control mode is set (S113, S115). If the remote control mode switch SWRC is OFF, and if the remote control mode is already selected, the remote control mode is set (S113; Y, S119), and if the remote control mode is not selected, the normal mode is set (S113; N, S117). Namely, the control is returned without changing the selected mode. If the remote control mode switch SWRC is turned ON from OFF, and if the remote control mode is set, the remote control mode is released (cleared) and the normal mode is set (S115; Y, S121), and if the remote control mode is not selected, the remote control mode is set (S115; N, S123). Namely, the remote control mode is set/released each time the remote control mode switch SWRC is turned ON.

Thereafter, whether the main switch SWM is ON is checked (S65). If the main switch SWM is OFF, the control is returned to step S15 (S65; N, S15). If the main switch SWM is ON, the state of the photometering switch SWS is checked (S67).

If the photometering switch SWS is ON, the CCD 33 is driven to input a video signal of the object image to thereby determine the angular displacement and the direction of the rotation of the AF motor 29. Consequently, the AF motor 29 is driven to move the focusing lens group L of the photographing lens 61 to an in-focus position (S69 through S73).

If the photometering switch SWS is OFF (S67; N), the control proceeds to step S75 without performing the AF operation.

At step S75, the object brightness calculation operation is carried out to determine the optimum shutter speed and exposure value, and are indicated in the internal finder LCD 45 and the external LCD 109 (S75, S77). Thereafter, the 125 ms timer starts; the interruption by the release switch SWR is permitted; and the permission of the interruption of the remote controller is cleared (S79, S81, S82). If the remote control mode is set, the interruption by the remote controller is permitted and the control proceeds to step S87 (S83; Y, S85; S87). If the remote control mode is not set, the control skips step S85 and proceeds to step S87 (S83; N, S87). If a set time of the 125 ms timer has lapsed, the control is returned to step S61 (S87; Y, S61). The 125 ms timer is adapted to determine a time interval at which the AF operation or AE operation is periodically carried out.

If the set time of the 125 ms timer has not yet lapsed, whether or not the set time (10 seconds) of the photometering timer has lapsed is checked (S87; N, S89). If the set time of 10 seconds has lapsed, the control is returned to step S27 (S89; Y, S27). Note that in the case that the control is returned after the time of the photometering timer is set at 2 seconds at step S101, the control is returned to step S27 after the lapse of 2 seconds.

If the set time of the photometering timer has not yet lapsed, it is checked whether or not the control is interrupted by the release switch SWR or the remote controller. If there is no interruption, the control is returned to step S87 (S89; N, S91; N, S93; N, S87).

If the control is interrupted by the release switch SWR or the remote controller (S91; Y) or (S91; N, S93; Y), the exposure operation is carried out after the photometering operation (brightness measuring operation) is carried out (S95, S97). After the exposure operation is completed, the film is wound by one frame, the photometering 2 s timer is set, and thereafter control is returned to the PH ON Loop (S99, S101, S61).

Namely, if the control is interrupted by the remote controller (S93; Y), the photometering operation is first carried out, and thereafter, the exposure operation is carried out (S95, S97).

The remote control photographing operation of the auto-focus camera in the illustrated embodiment will herein be described. A photographer sets the remote control mode using the remote control mode switching button 108. Consequently, the set remote control mode is indicated in the external LCD 109. Thereafter, the release button 105 is depressed by half a step (first operation) to perform an AF operation and a photometering operation (object brightness measuring operation) to thereby focus on a desired object. Thus, a desired photographing state is set. The photographer directs the remote controller (signal emitter) 200 toward the remote control signal receiver 113 of the camera body 101 and operates the remote control release button 201 to emit a remote control signal. The camera body 101 (CPU 11) carries out again a photometering operation (object brightness measuring operation), in accordance with the received remote control signal and performs an exposure operation. Since the camera body 101 (CPU 11) does not perform an AF operation until the exposure operation is carried out after the receipt of the remote control signal, no deviation of the focus set by the photographer takes place.

Although the remote control mode is set and released every time the remote control mode switch SWRC is turned ON at the remote control mode setting operation (S63), in the illustrated embodiment, it is possible to release the remote control mode after the exposure operation is carried out.

As may be understood from the above discussion, in the present invention, when the remote control signal is received, only the photometering device (object brightness measuring device) is actuated without operating the focusing device, and thereafter, the exposure device is operated. Therefore, if the remote control signal is emitted while the desired object is focused by the photographer, it is possible to take a picture of a desired object in focus. Consequently, upon a photographic operation being carried out via remote control, no troublesome operation, for example, switching the mode from the AF mode to the manual mode, is necessary, thus resulting in an improved operation efficiency.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A remote control auto-focus camera system comprising:
   a camera body, comprising a photographing operation member;
   a transmitter, provided separately from said camera body, that transmits a remote control signal;
   a focusing device, a photometering deice and an exposure device provided in said camera body; and
   a controller that receives said remote control signal transmitted by said transmitter and, in response, sequentially operates said photometering device and said exposure device without operating said focusing device;
   wherein said photometering device and said focusing device are operated upon a first operation of said photographing operation member and said exposure device is operated upon a second operation of said photographing operation member.

2. The remote control auto-focus camera system according to claim 1, wherein, when said focusing device and said photometering device have been operated in accordance with the first operation of said photographing operation member, and said remote control signal is received within a predetermined time limit, said controller operates said exposure device after performing a second operation of said photometering device.

3. The remote control auto-focus camera system according to claim 1, said camera body further comprising:
   a mode selecting member that selects one of a remote control photographing mode and a remote control canceling mode;
   wherein, when said remote control signal is received while said remote control photographing mode is selected, said controller initially operates said photometering device and subsequently operates said exposure device; and
   wherein, when said remote control signal is received while said remote control canceling mode is selected, said controller does not operate said photometering device and said exposure device.

4. The remote control auto-focus camera system according to claim 3, wherein when any one of said remote control photographing mode and said remote control canceling mode is selected, said focusing device is operated in accordance with said first operation of said photographing operation member.

* * * * *